350-3.7 SR

XR 3,435,244

INVENTORS C. B. BURCKHARDT
K. S. PENNINGTON
BY
R B Anderson
ATTORNEY

United States Patent Office 3,435,244
Patented Mar. 25, 1969

3,435,244
PATTERN RECOGNITION APPARATUS UTILIZING COMPLEX SPATIAL FILTERING

Christoph B. Burckhardt, Berkeley Heights, and Keith S. Pennington, Basking Ridge, N.J., assignors to Bell Telephone Laboratories, Incorporated, Murray Hill, Berkeley Heights, N.J., a corporation of New York Filed May 5, 1966, Ser. No. 547,831
Int. Cl. G01n *21/30*
U.S. Cl. 250—219 6 Claims This invention relates to pattern recogni ion apparatus, and more particularly, to apparatus for detecting specific patterns that may be contained on phototransparencies or the like regardless of the size and orientation of such patterns.

The desirability of reliable apparatus for detecting and recognizing specific patterns has been recognized for some time. For example, a device which would automatically determine whether patterns such as airplane images are included on aerial photographs would reduce the time and error of visual examination of the photographs. As another example, it would be desirable to provide apparatus which would release electrical signals in response to specific letters or numbers, and thereby translate alphanumeric data to electrical data which could be processed by modern computers, switching systems, etc.

One pattern recognition device, described in the paper "Signal Detection by Complex Spatial Filtering," by A. Vander Lugt, IEEE Transactions on Information Theory, vol. IT–10, page 139, Apr. 1964, includes a hologram recording of a Fourier transformed image of the pattern to be recognized. Generally speaking, a hologram is a recording of both the amplitude and phase of a light wavefront. A particularly suitable way of making a hologram is through the interference of coherent light from an object with an off-axis reference beam. A Fourier transform hologram is a recording of the amplitude and phase of the Fourier transform of an object; it can be made by locating a recording medium at the back focal plane of a lens with the object at the front focal plane.

In the Vander Lugt apparatus, a phototransparency to be examined is illuminated by coherent light which is projected through the phototransparency, a spherical converging lens, and the reference hologram. The phototransparency and the hologram are each separated from the lens by a distance equal to the lens focal length so that a Fourier transformed image of the phototransparency is projected onto the hologram. If the photo transparency contains the pattern to be recognized, and if that pattern is of a predetermined size and angular orientation, three fairly intense light spots will be projected from the reference hologram through a second lens onto an output plane. The reference hologram and the output plane are each separated from the second lens by the lens focal length. Two of the projected spots are ignored or masked out while the third has an amplitude distribution which is a cross-correlation of the pattern to be recognized and the pattern of the reference hologram and thus is representative of the location on the phototransparency of the recognized pattern. If the pattern is not included in the phototransparency, the light intensity projected through the hologram remains below some threshold level. For example, if the letter A is initially recorded on the reference hologram, a bright spot will be projected from the hologram if the transparency contains the pattern A of a specific size, regardless of its displacement on the photographic transparency. From the location of the spot, one can determine the location of the A on the phototransparency.

The capacity of the Vander Lugt apparatus to recognize a pattern independently of its location results from the fact that both the hologram recording of the pattern and the projected pattern from the transparency are Fourier transforms. However, if the pattern included on the transparency is larger or smaller than a specified size, or if it is oriented at some arbitrary angular position, it will not be recognized. Hence, the Vander Lugt apparatus is displacement insensitive, but it is sensitive to the magnification and orientation of the pattern to be recognized. If it were to be used to detect patterns arranged at arbitrary angular positions, the transparency would have to be mechanically rotated during examination, while for recognition of patterns of arbitrary size, the transparency would have to be magnified and demagnified. Apparatus for simultaneously providing these functions would obviously be exceedingly complicated and of slow operation.

Accordingly, it is an object of this invention to provide apparatus which will recognize patterns independently of their angular orientation or magnification.

This and other objects of the invention are attained in an illustrative embodiment thereof comprising a source of coherent light, a bundle of optic fibers, and a lens for projecting a Fourier transform of the output of the optical fiber bundle. A reference hologram recording of a Fourier transform of a redistributed representation of the pattern is made by projecting light from the pattern through the optical fiber bundle and the lens to a photographic medium where it interferes with the reference beam. The fiber bundle comprises flexible light-transmissive fibers which are curved to form at an output plane a redistributed representation of the light pattern projected into the bundle at an input plane. The hologram recording by interference with reference beam light is made in the conventional manner.

Light from a phototransparency to be tested is thereafter projected through the optical fiber bundle, the lens, and the reference hologram. If the transparency contains the pattern to be recognized and if the transparency is properly located, a bright spot exceeding some threshold will be projected from the hologram. An appropriate lens images this spot onto a screen.

Consider next the redistributed representation formed by the optical fiber bundle. By polar coordinates, the amplitude of the light projected through the transparency at any point can be considered a function of $(\varphi,\rho)$ where $\varphi$ is the angular postion of the point and $\rho$ is the distance from the origin of the coordinates. The purpose of the optical fiber bundle is to redistribute the light such that, at an output plane of the bundle, the light amplitude varies in a vertical direction as a function of $\varphi$, and in the horizontal direction as a function of $$\log\left(\frac{\rho_0}{\rho}\right)$$

where $\rho_0$ is a constant. With this provision it can be shown that any angular rotation of a pattern at the input plane will be manifested as a vertical movement at the output plane, while any magnification of the pattern at the input plane will be manifested as a horizontal movement at the output plane. As a result, the redistributed representation of a pattern projected onto the reference hologram will be of the same magnification and angular orientation as the representation recorded on the hologram regardless of the angular orientation and magnification of the pattern on the phototransparency. Hologram pattern recognition apparatus is thereby made insensitive to angular orientation and magnification.

As will become clearer later, unmodified recognition apparatus as described above is, unlike the Vander Lugt apparatus, sensitive to the displacement of the pattern. If the pattern is not located at a predetermined vertical and horizontal location with respect to the optical fiber bundle, it will not be detected by the apparatus. Accordingly, in a preferred embodiment the phototransparency is mechanically moved or scanned alternately in the horizontal direction and the vertical direction. Hence, when the pattern comes into proper registration during the scanning, a light spot is released as described before indicating pattern recognition.

As will be explained more fully later, the real image light spot to be detected is sometimes split into two components. It is therefore a feature of another embodiment of the invention that the spot is detected by two arrays of photodetectors, corresponding photodetectors of which are interconnected. The two components of the spot to be detected then impinge on interconnected photoconductors of the two arrays; intensities of the two components are thereby added to insure that their combined intensities exceed the threshold for detection.

Due to manufacturing imperfections, the component optical fibers will usually vary in length by more than a wavelength of light and would therefore ordinarily introduce a certain degree of error because of the resulting differences in phase shift of the transmitted light increments. In accordance with another feature, compensation for this error is made by an optical filter between the fiber bundle and the reference hologram to which light is projected. The optical filter is itself a hologram that is made by exposing a photosensitive medium to a reference beam and to a plane light wavefront transmitted through the fiber bundle. After the hologram filter is developed from the photosensitive medium, light from the bundle is projected through it during the pattern recognition operation described before. Because the filter is a hologram, light projected through it follows virtual image, real image, and direct paths. The direct and virtual image paths are masked. It can be shown that the light transmitted along the remaining real image path is independent of spatial variations due to random phase shifts in the fiber bundle; hence, the filter compensates for fiber length variations.

These and other objects and features of the invention will be better understood from a consideration of the following detailed description taken in conjunction with the accompanying drawing in which.

Figure 1:
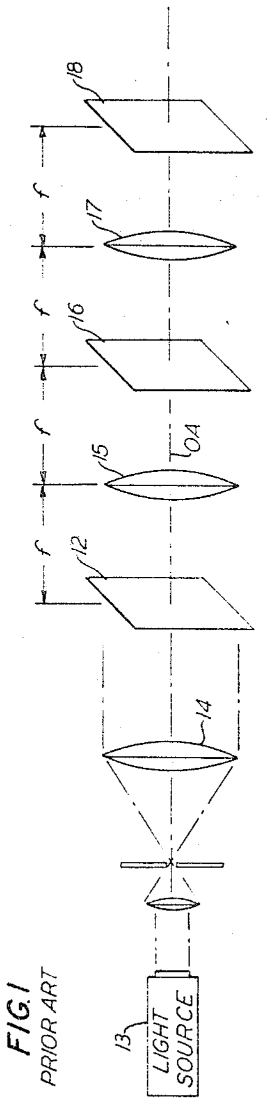
FIG. 1 PRIOR ART
FIG. 1 is a schematic illustration of pattern recognition apparatus in accordance with the prior art.

Referring now to FIG. 1 there is shown pattern recognition apparatus of the prior art for recognizing a pattern that may be included on a transparency 12. The apparatus comprises a coherent light source 13, a collimating lens 14, an objective lens 15, a reference hologram 16, an imaging lens 17, and an output plane 18 located along an optical axis OA. The reference hologram 16 is a photographic recording of a Fourier transform of the pattern to be recognized. Coherent light from source 13 is directed through the transparency 12 and lens 15 to the hologram 16. Because the transparency 12 and the hologram 16 are both located at planes which are separated from the objective lens 15 by a distance equal to the focal length $f$ of the objective lens, the light amplitude distribution projected onto the hologram 16 will be a Fourier transform of the light amplitude distribution transmitted through the transparency 12. Under these conditions, if the transparency 12 contains the pattern to be recognized, light exceeding some predetermined threshold value will be projected through the hologram 16 and will be imaged onto the output plane 18.

More precisely, if the transparency contains the pattern, three light beams or spots will be projected from the hologram along a direct path, a virtual image path, and a real image path. The location of the light beam spot on the real image path is indicative of the location on transparency 12 of the pattern to be recognized, while the light projected along the direct and virtual image paths is generally masked out or ignored. If the pattern is not included on the transparency 12, the light projected through the hologram 16 will be so dispersed as to have an intensity that remains below the predetermined threshold. Hence, appropriately positioned photoconductors along plane 18 can be used to detect the presence of a pattern on transparency 12 and also to indicate its location on the transparency.

Figure 2:
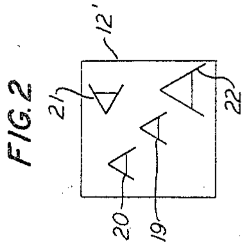
FIG. 2 is an illustration of various patterns that could be included on an input transparency of the apparatus of FIG. 1.

Referring to FIG. 2, assume that the pattern to be recognized is the letter A. Assume further that the A at position 19 is of an appropriate size and orientation for detection by the apparatus. Then, the A at position 20 will be detected even though it is displaced on the transparency 12'. As is known, displacement insensitivity results from the Fourier transform projections, during both recording of the reference hologram and during the pattern recognition operation. However, if the A has an angular orientation which differs from that recorded on the hologram 16, such as the A at position 21, or if it has a different magnification, such as the A in position 22, then it will not be recognized by the apparatus of FIG. 1. Hence, the apparatus of FIG. 1 is insensitive to displacements, but sensitive to the angular orientation and magnification of the pattern to be recognized. In order to recognize the patterns at locations 21 and 22 of FIG. 2, the transparency 12' would have to be progressively and simultaneously rotated and magnified, which would be a cumbersome task.

Figure 3:
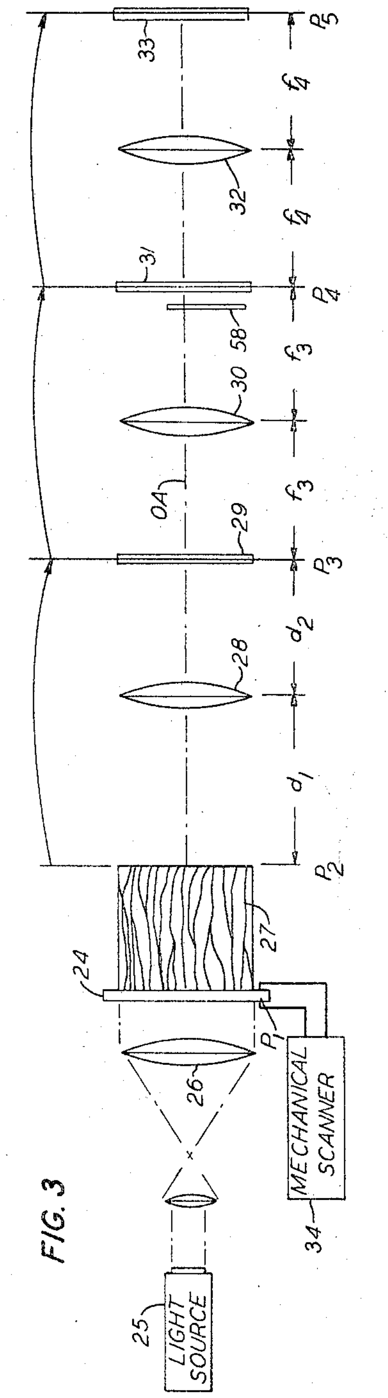
FIG. 3 is a schematic illustration of an illustrative embodiment of the invention.

Referring now to FIG. 3, there is shown pattern recognition apparatus in accordance with the invention which is insensitive to magnification and angular orientation of a pattern to be recognized on a transparency 24. Coherent light from a source 25 is directed through a collimating lens 26, a bundle 27 of optical fibers, an imaging lens 28, optical filter 29, an objective lens 30, a reference hologram 31, an imaging lens 32, to an output screen 33, all located along an axis OA. The purpose of the fiber bundle 27 is to redistribute the light intensity transmitted through transparency 24 in a manner to be described later. The redistributed representation of the light intensity which appears at the output plane $P_2$ is imaged onto a plane $P_3$ by the imaging lens 28. The optical filter 29 and the reference hologram 31 are located in planes each displaced from the lens 30 by a distance equal to the focal length of the lens so that a Fourier transform of the redistributed representation of plane $P_3$ is projected onto the hologram. If the transparency 24 contains the pattern to be recognized, a light beam or spot is projected onto the output screen 33 having an intensity that exceeds a predetermined threshold.

Figures 4, 5, 6:
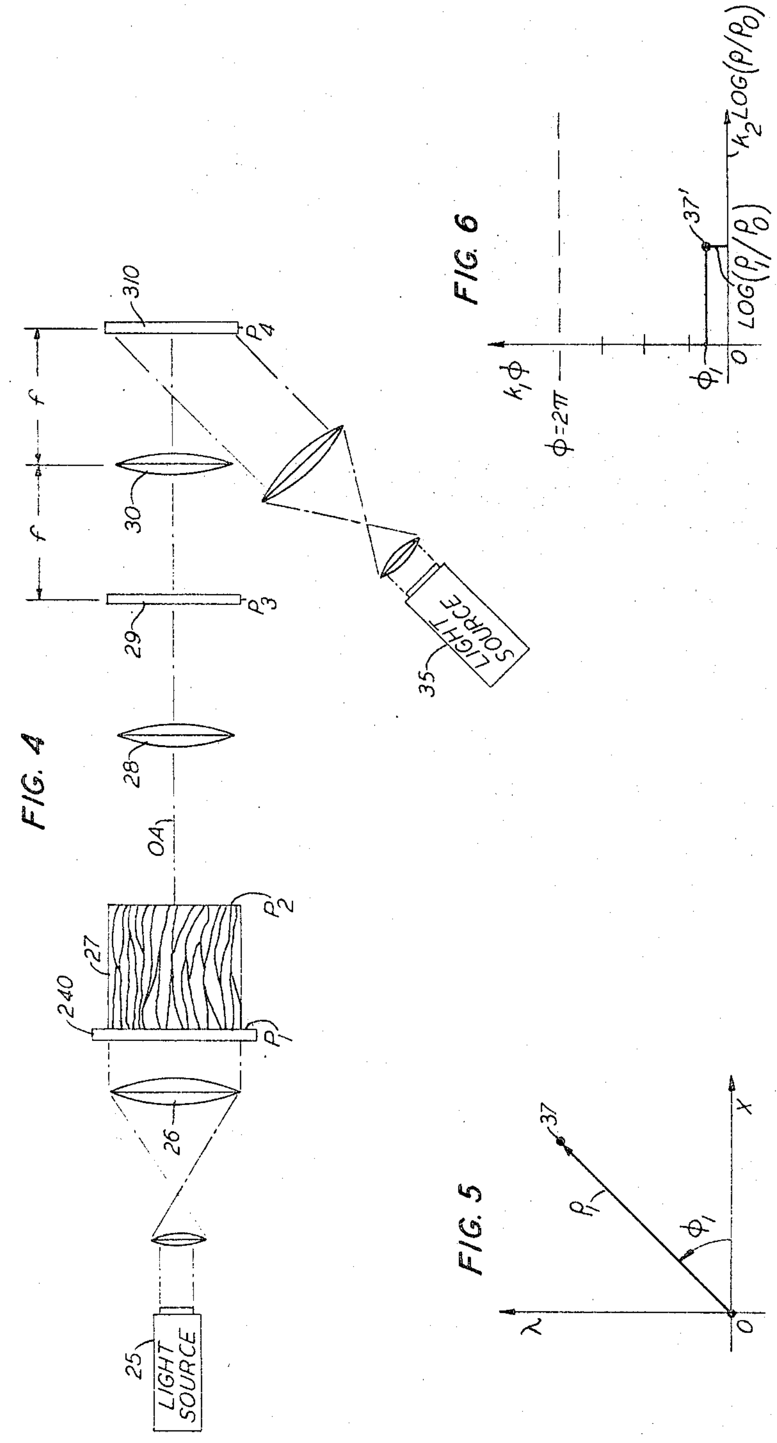
FIG. 4 is a schematic illustration of apparatus for making a reference hologram for use in the embodiment of FIG. 3.
FIGS. 5 and 6 are graphical representations illustrating relative location of corresponding points on planes $P_1$ and $P_2$ respectively of FIG. 3.

Part of the apparatus of FIG. 3 is used for making the reference hologram 31 as shown in FIG. 4. Light from the source 25 is projected through a transparency 240 containing the pattern to be recorded. As before, the fiber bundle 27 forms a redistributed representation of the pattern which is imaged on plane $P_3$ with a Fourier transform being imaged on a photographic medium 310 located at plane $P_4$. Reference beam light from a source 35 is projected onto the photographic medium 310 where it interferes with the Fourier transformed light to establish interference patterns constituting a hologram recording to the Fourier transform. As is known, the reference beam light may be derived from light source 25 through the use of an appropriate beam splitter, mirror and lenses. The photographic medium 310 is then developed to form the reference hologram 31 of FIG. 3.

In both the hologram recording apparatus and the pattern recognition apparatus, the purpose of the optical fiber bundle 27 is to redistribute the light at plane $P_1$ such that changes in angular orientation of a pattern at $P_1$ are manifested as vertical translations at plane $P_2$, while changes in pattern magnification at plane $P_1$ are manifested at plane $P_2$ as horizontal translations or displacements. As is known, an optical fiber is a fiber which is capable, within certain limits, of transmitting light from one end to the other even if it is bent to form a curve.

Consider next FIG. 5 which is a polar coordinate graph of the input plane $P_1$ on which the transparency 24 of FIG. 3 is located. A point 37 on a pattern of the transparency can be represented by its radius from the origin $\rho_1$ and its angle from the X axis $\varphi_1$. FIG. 6 is a cartesian coordinate graph of the output plane $P_2$. The fibers of the bundle 27 are curved such that the light intensity at plane $P_2$ varies in the vertical direction as a function of $\varphi$, and in the horizontal direction as a function of $$\log\left(\frac{\rho}{\rho_0}\right)$$

where $\varphi$ and $\rho$ are the polar coordinates at plane $P_1$ and $\rho_0$ is a constant. Hence, an optical fiber interconnects point 37 of plane $P_1$ having polar coordinates $\varphi_1$ and $\rho_1$ with a point 37' of plane $P_2$ having cartesian coordinates $k_1\varphi_1$ and $k_2$ $$k_2 \log\left(\frac{\rho_1}{\rho_0}\right)$$

where $k_1$ and $k_2$ are arbitrary constants of proportionality. In the illustration shown, $\varphi_1$ is approximately $\pi/4$ radians.

It can be seen that if the pattern of FIG. 5 were rotated, a point 37 on the pattern would rotate to change its polar coordinate $\varphi$, but the corresponding point 37' of FIG. 6 would move vertically rather than be rotated. Likewise, if the pattern of FIG. 5 were magnified, point 37 would move radially and its polar coordinate $\rho$ would change, but the corresponding point 37' of FIG. 6 would be moved in the horizontal direction. Hence, if all points on the graph of FIG. 5 are interconnected with corresponding points on the graph of FIG. 6, changes in angular orientation at the input plane $P_1$ are manifested by vertical translations in plane $P_2$ while changes in magnification in plane $P_1$ are manifested by horizontal translations in plane $P_2$. The terms horizontal and vertical are used herein only to signify relative orthogonal directions, rather than any particular absolute directions.

Imaging lens 28 of FIG. 3 images the redistributed representation of plane $P_2$ onto plane $P_3$. Accordingly, lens 28 is located such that $$\frac{1}{d_1}+\frac{1}{d_2}=\frac{1}{f_2} \qquad (1)$$

where $d_1$ is the distance between lens 28 and $P_2$, $d_2$ is the distance between lens 28 and plane $P_3$ and $f_2$ is the focal length of lens 28. The general principle of pattern recognition through the projection of a Fourier transform of the distribution on plane $P_3$ onto the reference hologram of plane $P_4$ is substantially the same as that of the prior art. Accordingly, planes $P_3$ and $P_4$ are both separated from lens 30 by a distance equal to the focal length $f_3$ of lens 30 and planes $P_4$ and $P_5$ are both separated from lens 32 by a distance equal to the focal length $f_4$ of lens 32. If the Fourier transform pattern projected onto plane $P_4$ corresponds with the Fourier transform recording on the hologram 31, a bright spot is projected onto screen 33.

In accordance with known principles, a pattern on plane $P_3$ corresponding to a recorded pattern of the reference hologram can be recognized regardless of its displacement from the optical axis. Since the fiber boundle 27 converts angular orientations and magnifications of the pattern on transparency 24 to vertical and horizontal displacements, patterns of various magnifications and angular orientation are capable of being recognized by the apparatus of FIG. 3. Hence, the prime objective of the invention is realized.

Figure 7:
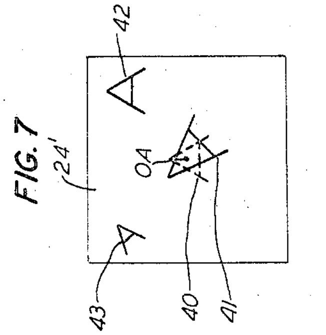
FIG. 7 is an illustration of various patterns that may be included on an input transparency of the embodiment of FIG. 3.

While the apparatus of FIG. 3 as described thus far is orientation and magnification insensitive, it is, in the absence of any modification, sensitive to pattern displacement. Referring to FIG. 7, assume that a Fourier transform of a redistributed representation of pattern 40 were originally recorded on the reference hologram 31 of FIG. 3. Then, if a pattern 41 is included on a transparency 24 to be processed by the apparatus of FIG. 3, pattern 41 will be recognized even though its angular orientation and magnification differs from the pattern originally recorded. However, the displaced pattern 42 will not be recognized even though it is of the same angular orientation and magnification as the original pattern 40, unless it is moved to a position corresponding to that of pattern 40. Likewise, pattern 43 will be recognized if it is moved to the position of original pattern 40 even though pattern 43 has a different angular orientation and magnification. In short, all patterns which can be derived from the original pattern by a magnification and rotation which leave the point $\rho=0$ unchanged can be recognized by the apparatus; if a translation of $\rho=0$ is involved, the pattern can no longer be recognized.

Figure 8:
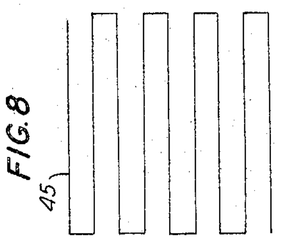
FIG. 8 is an illustration of a path over which the transparency of the embodiment of FIG. 3 is moved.

Hence, referring again to FIG. 3, a mechanical scanner 34 is incorporated into the recognition apparatus to move the transparency 24 alternately in horizontal and vertical directions so that if the pattern is included on the transparency, it will be recognized by the apparatus when it reaches a proper registration with respect to the optical axis. The mechanical scanner 34 is designed to move the transparency 24 along a path 45 illustrated in FIG. 8. When the pattern 43 of FIG. 7 reaches a position corresponding to original pattern 40, an output will be projected on the output plane 33 of the apparatus even though pattern 43 is of a different angular orientation and magnification. Likewise when pattern 42 reaches the proper displacement, it too will be recognized. The construction of a scanner to perform the described function is within the ordinary skill of workers in the art and therefore will not be discussed.

Referring again to FIG. 3, the purpose of the optical filter 29 is to compensate for spatial phase variations of the light distribution along plane $P_2$ resulting from variations in the lengths of the component optical fibers of fiber bundle 27. The filter 29 is a hologram made by that part of the FIG. 3 apparatus shown in FIG. 9 comprising the light source 25, collimating lens 26, fiber bundle 27, and lens 28. No transparency is included in plane $P_1$, and an essentially planar wavefront from source 25 is directed through the fiber bundle 27 and is focused on a photographic medium 29'. Coherent reference beam light from a source 47 is directed against the photographic medium 29' at an angle of incidence $\theta$ for forming interference patterns in the photographic medium. As described before, the reference beam may be derived from source 25 if so desired. The photographic plate 29' is then developed to form the hologram optical filter 29 of FIG. 3.

Figures 9, 13, 14:
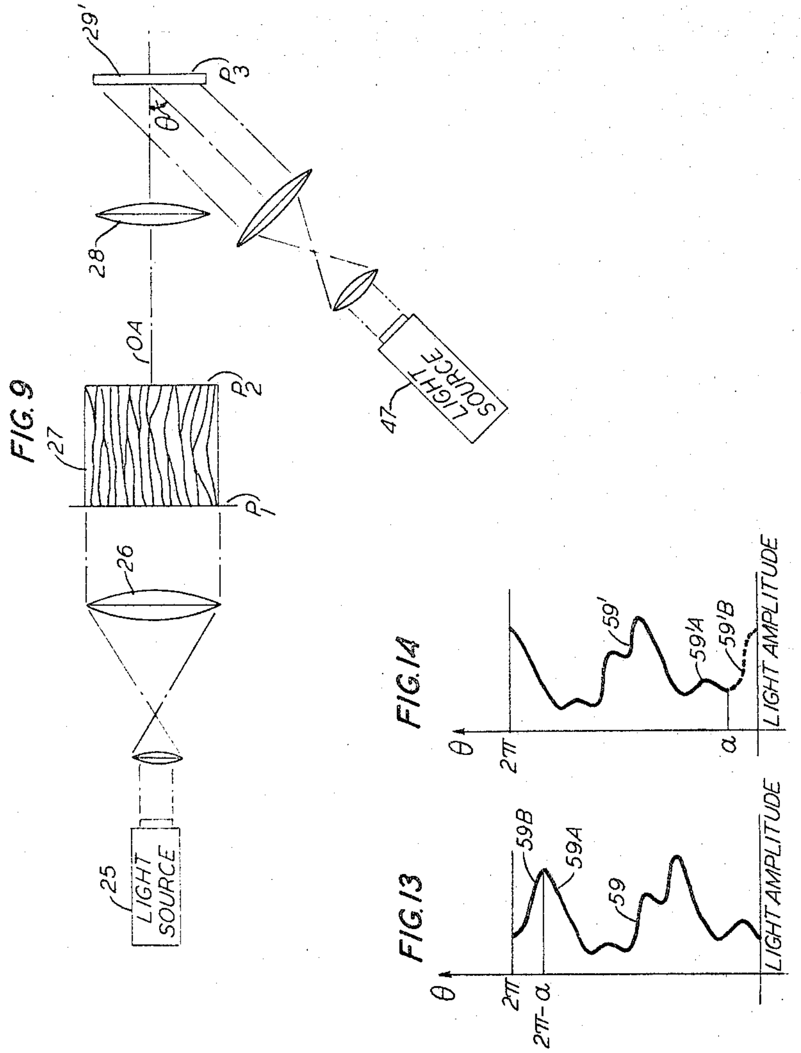
FIG. 9 is a schematic illustration of apparatus for making an optical filter for use in the apparatus of FIG. 3.
FIGS. 13 and 14 are graphs of light intensity distribution at planes $P_2$ and $P_3$ of the apparatus of FIG. 3.

Consider next the formation of the filter as shown in FIG. 9. After passing through the fiber bundle the amplitude A of the wavefront at planes $P_2$ and $P_3$ will be given by $$A=|A|\cdot e^{j\psi(x_2,y_2)} \tag{2}$$

where $\psi$ is the characteristic phase variation of the fiber bundle caused by the variations of transmission lengths. $\psi(x_2,y_2)$ is the total phase variation characteristic of the fiber bundle, and |A| is the initial wavefront amplitude at plane $P_1$. The amplitude B of the reference beam impinging on the photographic plate 29' is given by $$B=|B|\cdot e^{j\xi y_2} \tag{3}$$

where $$\xi=\frac{2\pi \sin \theta}{\lambda} \tag{4}$$

and where $\theta$ is the angle between the reference beam and the axis of the optical system as shown on FIG. 9, and $\lambda$ is the wavelength of the reference beam light. The photographic plate 29' placed in plane $P_3$ will then record light intensity $\chi\chi^*$ according to the relationship $$\chi\chi^*=(|A|e^{j\psi(x_2,y_2)}+|B|e^{j\xi y_2})(|A|e^{-j\psi(x_2,y_2)}+|B|e^{-j\xi y_2}) \tag{5}$$

which can be rewritten as $$\chi\chi^*=|A|^2+|B|^2+|A||B|e^{j(\xi y_2-\psi[x_2,y_2])}+|A||B|e^{-j(\xi y_2-\psi[x_2,y_2])} \tag{6}$$

Consider next the pattern recognition apparatus of FIG. 3. A wavefront passing through the transparency 24 will have a complex amplitude C at plane $P_1$ and an amplitude $C_2$ at plane $P_3$ given by $$C_2=C\cdot e^{j\psi(x_2,y_2)} \tag{7}$$

The wavefront of light passing through the hologram filter 29 is then given by the product of Equations 6 and 7 as $$\begin{aligned} &C\cdot e^{j\psi(x_2,y_2)}\cdot\chi\chi^* \\ &=Ce^{j\psi(x_2,y_2)}(|A|^2+|B|^2) \\ &+C|A||B|e^{j\xi y_2}+C|A||B|e^{-j\xi y_2+j2\psi(x_2,y_2)} \end{aligned} \tag{8}$$

The components of the right-hand side of Equation 8 represent the light components which follow the direct path, the real image path, and the virtual image path from the hologram. The amplitude $C_{ri}$ of the light component following the real image path is given by the second term of Equation 8 or, $$C_{ri}=C|A||B|e^{j\xi y_2} \tag{9}$$

It can be seen that while the component represented by Equation 9 contains all of the information of the input wave of amplitude C, it does not include the undesired component $\psi(x_2,y_2)$ resulting from the phase variations of the fiber bundle. Hence, with respect to the real image component represented by Equation 9 filter 29 effectively cancels these undesired phase variations.

Figure 10:
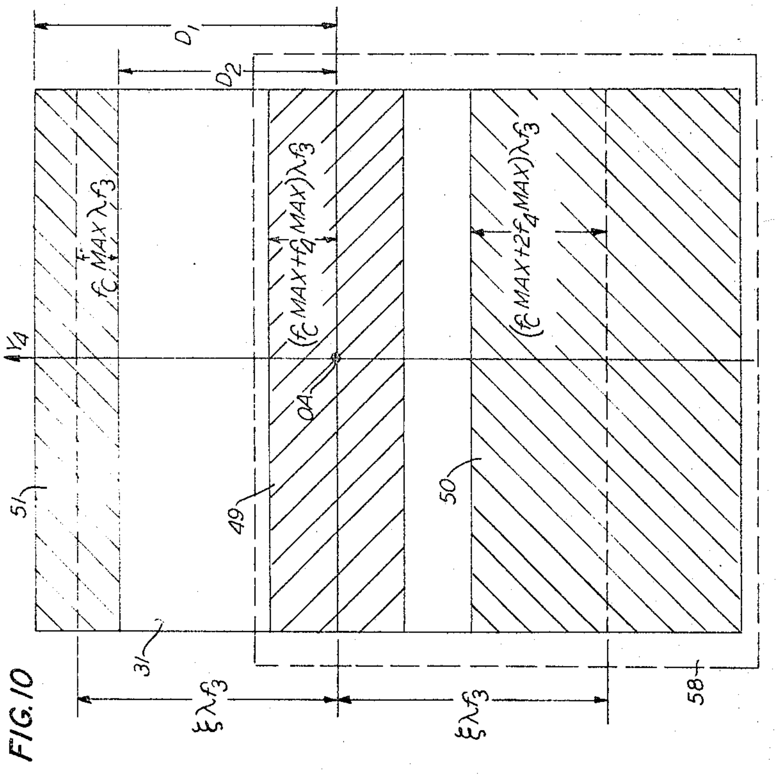
FIG. 10 is an illustration of areas of light impingement on plane $P_4$ and mask 58 of the embodiment of FIG. 3.

The three light components from plane $P_3$ of FIG. 3 are projected toward plane $P_4$ as shown in the graph of FIG. 10 where OA is the optic axis. The light components represented by the first term of Equation 8 impinge on plane $P_4$ over area 49 while the components of the third term of Equation 8 impinge over area 50. The desired components, that is, the components represented by the second term of Equation 8 and also by Equation 9, impinge on plane 4 only over the area 51. Since only the light impinging on area 51 is desired, the areas represented by regions 49 and 50 are preferably masked out by a mask 58 shown diagrammatically in FIGS. 10 and 3. As shown in FIG. 10, the mean displacement of area 51 from the optical axis is equal to $\xi\lambda f_3$ where $f_3$ is the focal length of lens 30. As can be seen from the drawing, the maximum displacement $D_1$ of area 51 from the optical axis is given by $$D_1=\xi\lambda f_3+f_{c\ max}\lambda f_3 \tag{10}$$

while the minimum displacement of area 51 is given by $$D_2=\xi\lambda f_3+f_{c\ max}\lambda f_3 \tag{11}$$

where $f_{c\ max}$ is the maximum spatial frequency of the wavefront C. The dimensions of the masked areas 49 and 50 are shown in FIG. 10 as a function of $f_{\psi\ max}$ which is the maximum spatial frequency of the phase variation produced by the optical fiber bundle. These dimensions should, of course, be at least approximately determined for the purpose of making the mask 58. Although only the area 51 of the hologram is illuminated, this is sufficient because all of the information of the hologram is contained therein.

As was mentioned before, the light projected through reference hologram 31 also follows direct, virtual image, and real image paths. As in the prior art embodiment of FIG. 1, only the real image component projected on screen 33 is used for pattern recognition; accordingly, a mask such as mask 58 can be inserted in front of screen 33 for blocking the undesired virtual and direct path components if so desired. Alternatively, the operator can simply ignore any light spots in the direct or virtual image path regions of the screen.

Figure 11:
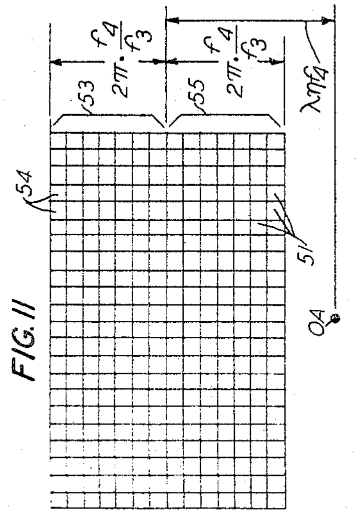
FIGS. 11 and 12 are schematic illustrations of photodetector arrays that may be used at plane $P_5$ of the embodiment of FIG. 3.
Figure 12:
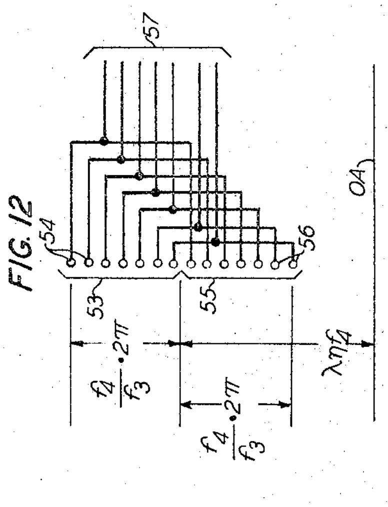

The use of the optical fiber bundle of FIG. 3, however, tends to cause the desired real image component projected from reference hologram 31 to be split into two components. For best operation of the apparatus, these two components should be combined, because if their combined intensities exceed a threshold value, a recognition of the pattern on transparency 24 is signified. Referring to FIGS. 11 and 12, it is often preferred that a photodetector array 53 comprising photodetectors 54 and a photodetector array 55 comprising photodetectors 56 be used in place of the screen 33 of FIG. 3. As shown in FIG. 12, corresponding photodetectors 54 and 56 of arrays 53 and 55 are interconnected to give a combined output on one of a plurality of electrical output lines 57. It can be shown that when the real image light from the reference hologram is split into two components, they will impinge on corresponding photodetectors 54 and 56 so that their intensities will be combined and will be manifested by a combined electrical output on one of the output lines.

In order to understand the real image component split, refer next to FIGS. 13 and 14 which are graphs of the light amplitude distributions at planes $P_2$ and $P_3$ resulting from a pattern input at plane $P_1$. Assume that the pattern at plane $P_1$ has a light distribution extending through $2\pi$ radians by the polar coordinate system (for example, pattern 40 of FIG. 7 describes $2\pi$ radians because it completely surrounds the polar coordinate origin). Then the light distribution at planes $P_2$ and $P_3$ will also extend to $2\pi$ on the $\varphi$ axis as shown by the light distribution curve 59 of FIG. 13. If the pattern on plane $P_1$ is subsequently rotated through a postiive angle $\alpha$, the curve 59, it turns out, will not be uniformly translated vertically on $\varphi$ axis. Rather, only that part of the distribution which does not exceed $2\pi$ radians after rotation will be uniformly translated.

Consider the curve 59 of FIG. 13 to be composed of a portion 59A extending from 0 to $2\pi-\alpha$ radians and a portion 59B extending from $2\pi-\alpha$ to $2\pi$ radians. After rotation of the original pattern through $\alpha$ radians, portion 59A will be translated $\alpha$ radians vertically upwardly to the position 59'A of FIG. 14. Portion 59B, however, will be translated downwardly to position 59'B. Each of the two disconnected segments 59'A and 59'B will correspond to part of the recorded reference hologram pattern, and hence, two convolution spots will be formed. The convolution spot of segment 59'A extending from $\alpha$ to $2\pi$ will be formed at a vertical position $k_1\alpha$, and the spot resulting from segment 55'B extending from 0 to $\alpha$ will appear at $k_1(\alpha-2\pi)$, where $k_1$ is a constant to be described below.

It can be shown that the mean displacement of the reference hologram real image path on plate $P_5$ is $\lambda\eta f_4$, where $\lambda$ is the optical wavelength, $\eta$ is the spatial frequency of the reference beam used for making the reference hologram (the beam projected from source 35 of FIG. 4), and $f_4$ is the focal length of lens 32 of FIG. 3. It can further be shown that one real image component will impinge on array 53 which extends over a distance from $\lambda\eta f_4$ to $\lambda\eta f_4+k_1 2\pi f_4/f_3$, while the other real image component will impinge on array 55 which extends from $\lambda\eta f_4-k_1 2\pi f_4/f_3$ to $\lambda\eta f_4$, where $f_3$ is the focal length of lens 30. In the example given previously, one spot will impinge on a photoconductor 54 at a distance from the optical axis of $\lambda\eta f_4+k_1\alpha f_4/f_3$ and the other spot will impinge on a photodetector 56 at a vertical distance of $\lambda\eta f_4+k_1(\alpha-2\pi)f_4/f_3$. The horizontal position of impingement is, of course, a function of $\rho$, the magnification. The two photoconductors impinged are interconnected and their outputs combined as described before.

In summary, pattern recognition apparatus is shown in FIG. 3 which is insensitive to the angular orientation or the magnification of the pattern to be recognized. To enable recognition of displaced patterns, a mechanical scanner 34 is included for moving the input transparency along a path such as that shown in FIG. 8. A hologram filter 29 is included in the apparatus to compensate for optical fiber length variations. Because the light spot projected from the hologram may be split into two components, two photodetector arrays shown in FIGS. 11 and 12 may be employed for combining the components.

The embodiments presented are intended to be merely illustrative of the inventive concept, and alternative structures may be used if so desired. For example, an opaque object, rather than a transparency, can be tested for pattern recognition by reflecting coherent light from the object. The outputs of the photodetector of FIGS. 11 and 12 can be used in a variety of ways that would be obvious to those skilled in the art. Other modifications and embodiments may be made without departing from the spirit and scope of the invention.

What is claimed is:

1. Apparatus for recognizing a specific pattern on an object comprising:
   means for causing coherent light to be projected from the object;
   means for transmitting and redistributing the light such that in an output plane the light amplitude varies in the vertical direction as a function of $\varphi$ and in the horizontal direction as a function of $$\log\left(\frac{\rho}{\rho_0}\right)$$

where $\varphi$ and $\rho$ are the polar coordinates of the light projected from the object and $\rho_0$ is a constant, thereby forming a redistributed representation of the object;
   a reference hologram recording of the Fourier transform of the redistributed representation of the specific pattern;
   means for projecting to the hologram a Fourier transform of the redistributed representation of the object, whereby light intensity exceeding a predetermined threshold may be transmitted through the hologram if the object includes thereon the specific pattern, regardless of the magnification or rotational orientation of the pattern and additional means for forming a Fourier transform of the light transmitted through the hologram.

2. The apparatus of claim 1 wherein:
   the means for transmitting and redistributing light comprises a bundle of optical fibers.

3. The apparatus of claim 2 further comprising:
   means for alternately moving the object in horizontal and vertical directions with respect to the optical fiber bundle.

4. The apparatus of claim 2 wherein:
   the object being tested is a photographic transparency through which coherent light is projected.

5. The apparatus of claim 2 wherein:
   the light intensity transmitted through the hologram which exceeds the threshold follows real image paths, virtual image paths, and direct paths;
   and further comprising first and second arrays of photodetectors, located in the Fourier transform plane of said additional means, for intercepting light that follows the real image paths;
   the first array being located vertically above the second array;
   each photodetector of the first array being connected to a photodetector of the second array, the interconnected photodetectors respectively having corresponding locations in the first and second array, whereby electrical energy is released from each pair of interconnected photodetectors as a function of the intensity of light impinging simultaneously on both photoconductors of the pair.

6. The apparatus of claim 2 further comprising:
   means comprising a hologram filter located between the optical fiber bundle and the reference hologram for splitting light projected from the fiber bundle into real image, virtual image, and direct path components;
   and means for masking the virtual image and real image components projected from the hologram filter.

References Cited

UNITED STATES PATENTS

| | | |
|---|---|---|
| 3,290,505 | 12/1966 | Stavis. |
| 3,325,594 | 6/1967 | Goldhammer et al. |

OTHER REFERENCES

Vander Lugt: IEEE Trans. on Information Theory, vol. IT–10, April 1964, pp. 139–145.

DAVID SCHONBERG, *Primary Examiner.*

RONALD J. STERN, *Assistant Examiner.*

U.S. Cl. X.R.

250—219; 340—146.3; 350—3.5, 96, 162; 356—71